US007000990B1

(12) United States Patent
Liu et al.

(10) Patent No.: US 7,000,990 B1

(45) Date of Patent: Feb. 21, 2006

(54) RECLINER FOR VEHICLE FOLDABLE SEAT

(75) Inventors: Hsing Lung Lewis Liu, Novi, MI (US); Wen H. Chiu, Livonia, MI (US); Karl A. Murphy, Novi, MI (US)

(73) Assignee: Porter Group LLC, Novi, MI (US)

( * ) Notice: Subject to any disclaimer, the term of this patent is extended or adjusted under 35 U.S.C. 154(b) by 22 days.

(21) Appl. No.: 11/086,921

(22) Filed: Mar. 22, 2005

(51) Int. Cl.
*B60N 2/30* (2006.01)

(52) U.S. Cl. .................................... 297/336; 296/65.09

(58) Field of Classification Search ................ 297/335, 297/336, 378.12; 296/65.03, 65.05, 65.09

See application file for complete search history.

(56) References Cited

U.S. PATENT DOCUMENTS

| | | | | |
|---|---|---|---|---|
| 4,484,776 | A * | 11/1984 | Gokimoto et al. | 296/65.09 |
| 4,627,656 | A * | 12/1986 | Gokimoto et al. | 296/65.09 |
| 6,065,804 | A * | 5/2000 | Tanaka et al. | 297/336 |
| 6,345,867 | B1 * | 2/2002 | Hellrung et al. | 297/336 |
| 6,478,358 | B1 * | 11/2002 | Okazaki et al. | 296/65.09 |
| 6,520,581 | B1 * | 2/2003 | Tame | 297/336 |
| 6,523,899 | B1 * | 2/2003 | Tame | 297/335 |
| 6,793,285 | B1 * | 9/2004 | Tame | 297/336 |
| 6,860,560 | B1 | 3/2005 | Chiu et al. | |
| 6,860,562 | B1 * | 3/2005 | Bonk | 297/378.12 |

* cited by examiner

*Primary Examiner*—Peter R. Brown
(74) *Attorney, Agent, or Firm*—Brooks Kushman P.C.

(57) ABSTRACT

A vehicle foldable seat back recliner (20) is operable to permit movement of a foldable vehicle seat (14) so that its seat bottom (16) and seat back (18) store in either a folded vertical position or a folded horizontal position.

10 Claims, 4 Drawing Sheets

RECLINER FOR VEHICLE FOLDABLE SEAT

BACKGROUND OF THE INVENTION

1. Field of the Invention

This invention relates to a recliner for a foldable vehicle seat whose seat back can fold forwardly with respect to the seat alongside the associated seat bottom with the seat components either vertical or horizontal.

2. Background Art

Vehicle seats conventionally include recliners that provide positioning of a seat back on a seat bottom in an upwardly extending position while permitting forward pivoting of the seat back. Such forward pivoting is useful in different applications, such as when the seat back pivots forwardly so that its back side faces upwardly and provides a cargo floor or when the seat is in a front position that pivots forwardly to permit access to a rear seat in a two-door vehicle. Also, sometimes the seat back is folded parallel to the seat bottom and both are pivoted about a forward edge of the seat bottom so as to be in a vertical position so as to increase the cargo space of the vehicle.

SUMMARY OF THE INVENTION

An object of the present invention is to provide an improved recliner for a vehicle foldable seat utilized with an associated vehicle.

In carrying out the above object, the vehicle foldable seat recliner of the invention includes a seat bottom member for mounting on a seat bottom of the foldable seat and also includes a seat back member for mounting a seat back of the foldable seat. The seat back member has a pivotal connection for providing pivotal support of the seat back member on the seat bottom member for pivotal movement about a pivotal axis between an upright seating position and a folded storage position where the seat back extends generally parallel to the seat bottom. A recliner latch mechanism of the recliner has a latched position for holding the seat back member on the seat bottom member in the upright seating position and has a released position for permitting pivotal movement of the seat back member from the upright seating position to the folded storage position. A recliner latch actuator of the recliner moves the recliner latch mechanism from the latched position to the released position to permit pivoting of the seat back member from its upright seating position to its folded storage position. A secondary latch actuator of the recliner has a release lever including a connector for connecting to a rear latch associated with a rear portion of the seat bottom to selectively release the rear latch from a latched condition to the associated vehicle to a released condition to permit pivoting of the seat bottom about a forward portion thereof from a horizontal position to an upwardly extending position. The secondary latch actuator includes a connection lever having a connected position for connecting the release lever to the seat back member for pivoting therewith upon actuation of the recliner latch actuator for movement from the upright seating position toward the folded storage position to move the connector thereof to release the rear latch so as to permit the pivoting of the seat bottom about the forward portion thereof to the upwardly extending position as the seat back pivots to the folded storage position in an upright direction alongside the seat bottom. An uncoupling member of the recliner moves the connection lever from its connected position to an unconnected position with respect to the release lever after the rear latch is released so the seat back member can continue to pivot to the folded storage position without any connection to the rear latch. The connection lever has a connection to a seat back actuator that is actuateable when the seat back is in the upright seating position to move the connection lever from its connected position to its unconnected position with respect to the release lever so the rear latch remains latched, and the connection lever also has a connection to the rear latch actuator so the actuation of the seat back actuator also actuates the recliner latch actuator to move the recliner latch mechanism from its latched position to its released position so the seat back can pivot to the folded storage position while the seat bottom remains in a generally horizontal position with the seat back folded horizontally over the seat bottom.

The release lever is pivotally supported by the pivotal connection of the seat back member on the seat bottom member and includes a leg that extends downwardly from the pivotal axis and has a distal end that supports the connector for providing connection of the release lever to the rear latch. The release lever also includes a connection lobe, and the connection lever includes a connection pin for contacting the release lever connection lobe in the connected position to move the release lever with the seat back member to release the rear latch. A spring biases the connection lever to engage its connection pin with the release lever connection lobe.

The connection lever includes a slot that receives the pivotal connection of the seat back member on the seat bottom member to provide a first pin and slot connection at the pivotal axis. The connection lever and the seat back member include a second pin and slot connection. Furthermore, the seat bottom member supports the uncoupling member which moves the connection lever with respect to the release lever upon initial pivoting of the seat back to release the release lever from pivoting therewith after the rear latch has been released. The construction of the connection lever includes a first end that is contacted by the uncoupling member on the seat bottom member, and the connection lever also has a second end that supports the connector to the seat back actuator at a location adjacent the second pin and slot connection between the connection lever and the seat back member.

The spring that biases the connection member extends between the pivotal connection of the seat back member and the slot of the second pin and slot connection to bias the connection lever to contact the connection pin of the connection lever with the release lever connection lobe.

The objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
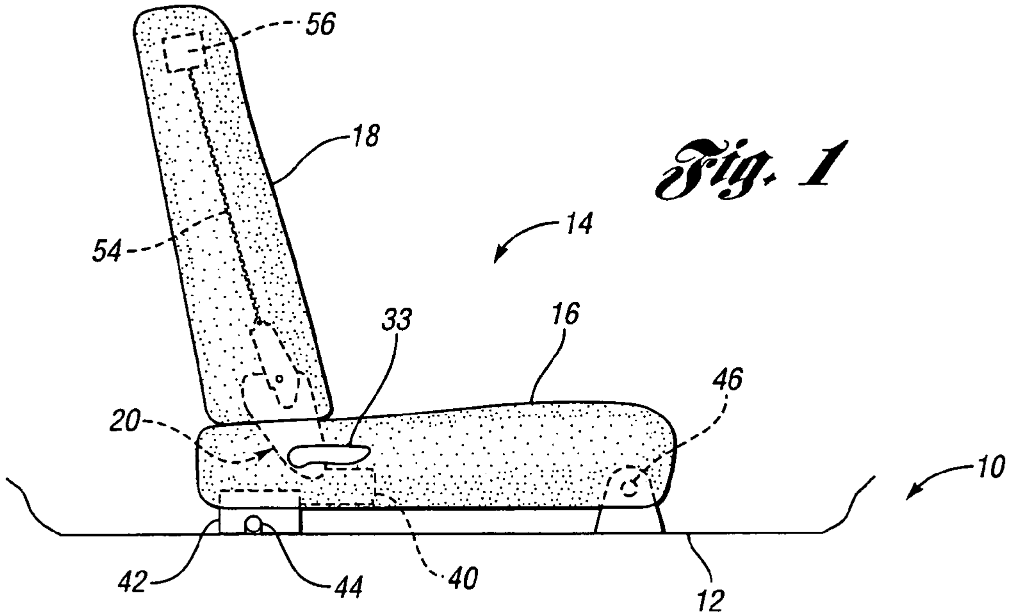
FIG. 1 is a schematic side elevation view of a foldable vehicle seat including a recliner constructed in accordance with the present invention to support and control pivotal movement of a seat back on a seat bottom of the seat.
Figure 2:
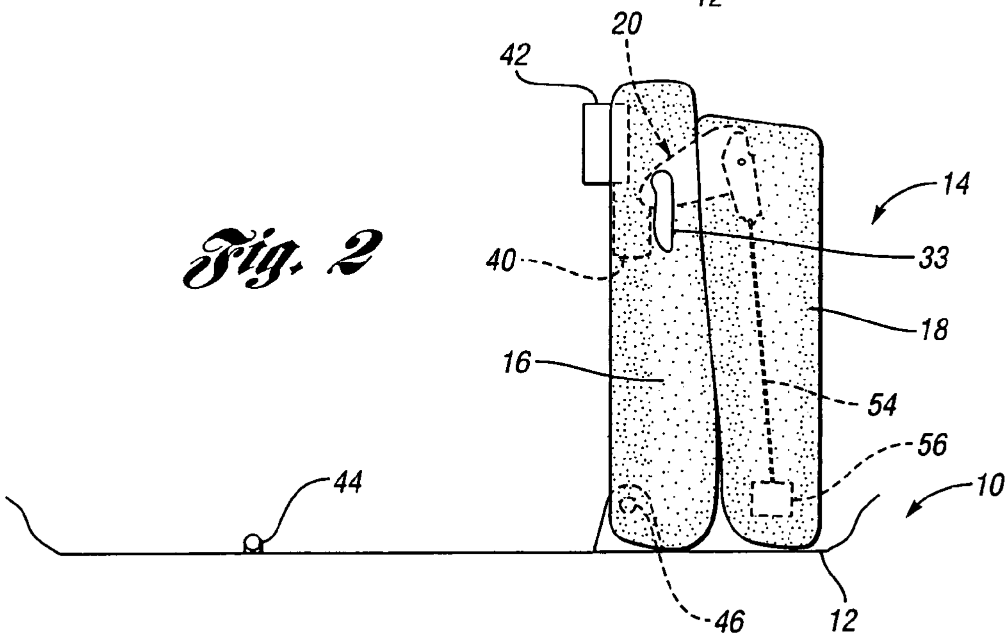
FIG. 2 is a schematic view taken in the same direction as FIG. 1 but showing the seat after a rear latch has been released to permit upward pivoting of the seat bottom to a vertical position and pivoting of the seat back to a vertical position along side the seat bottom for storage that provide a cargo space to the rear of the seat.
Figure 3:
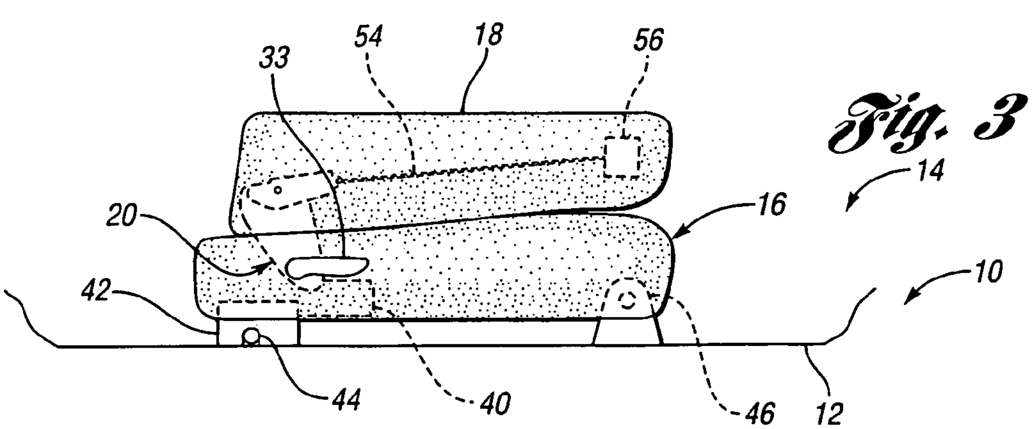
FIG. 3 is a view also taken in the same direction as FIG. 1 but showing the seat in another stored position where the seat bottom remains horizontal with the seat back folded forwardly to a horizontal position of the seat back.

With reference to FIG. 1 of the drawings, a vehicle schematically indicated by 10 includes a floor 12 that supports a foldable seat 14 for movement between the use position shown and the folded storage positions of FIGS. 2 and 3 as is hereinafter more fully described. The foldable vehicle seat 14 includes a seat bottom 16 and a seat back 18, a recliner 20 is constructed in accordance with the present invention to support the seat back 18 for pivoting on the seat bottom 16 and to permit positioning of the seat its FIG. 1 use position or in either the vertical folded position of FIG. 2 or the horizontal folded position of FIG. 3 as is hereinafter more fully described.

Figure 4:
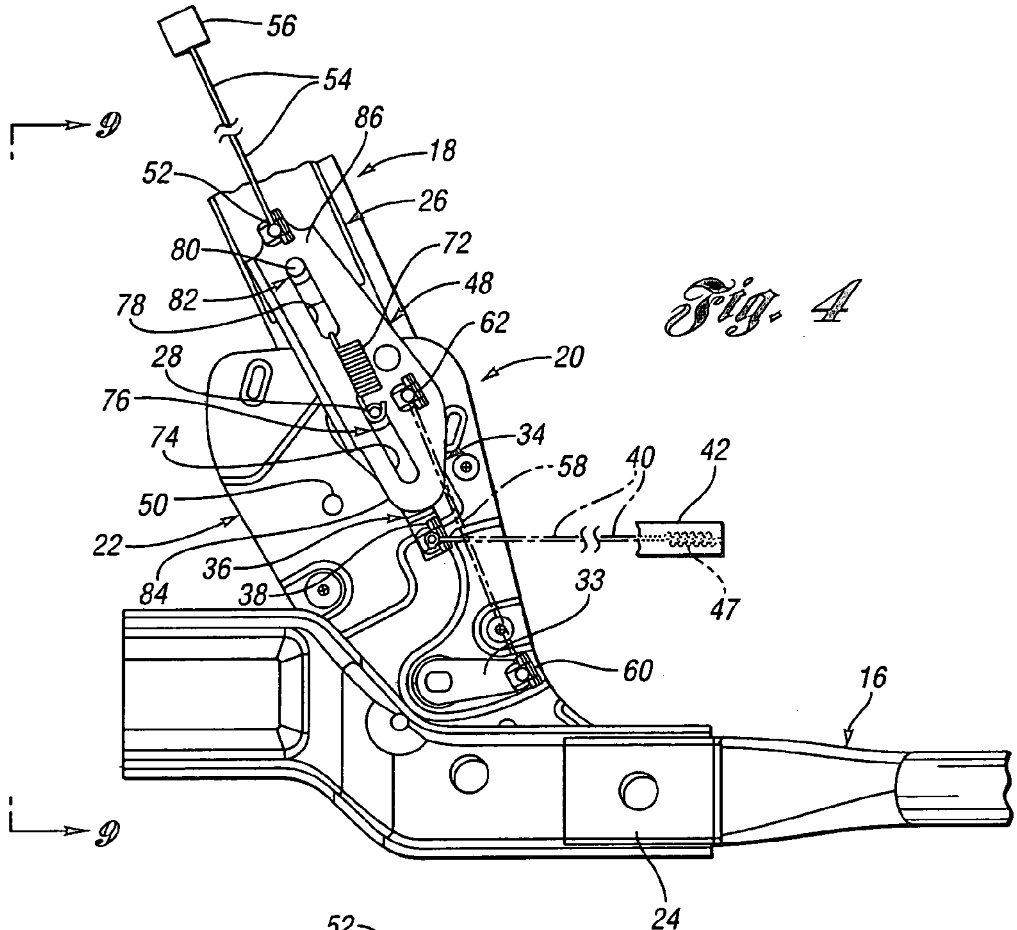
FIG. 4 is a side elevational view taken in the same direction as FIG. 1 to illustrate the recliner which is shown positioned to support the seat back in its generally upright use position.
Figure 9:
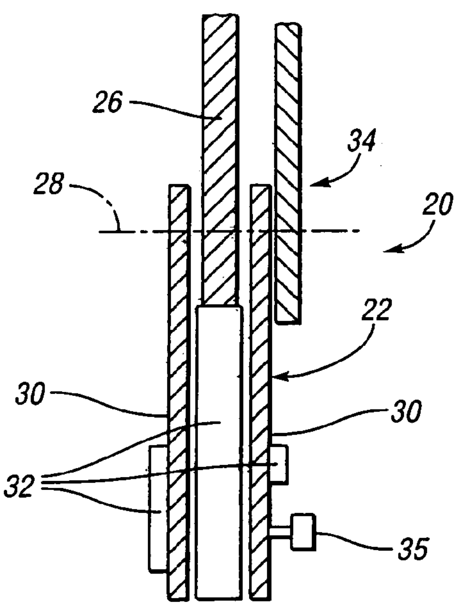
FIG. 9 is a somewhat schematic view of the recliner taken along the direction of line 9—9 in FIG. 4.

With reference to FIG. 4, the recliner 20 includes a seat bottom member 22 for mounting on the seat bottom 16 at its frame 24 in any conventional manner. Likewise, a seat back member 26 mounts the seat back 18 of the foldable seat and has a pivotal connection 28 for providing pivotal support of the seat back member on the seat bottom member for pivotal movement about a pivotal axis between the upright seating position shown in FIG. 1 and either of the folded storage positions shown in FIGS. 2 and 3 where the seat back extends generally parallel to the seat bottom. As shown in FIG. 9, the recliner 20 is actually constructed with its seat bottom member 22 having two spaced plates 30 between which the pivotal connection 28 extends to support the seat back for movement between the generally upright use position and the folded storage position previously described. A recliner latch mechanism 32 of the recliner includes components supported between and on opposite sides of the pair of plates 30 and has a latched position for holding the seat back member 26 on the seat bottom member 22 in the upright seating position and has a released position for permitting pivotal movement of the seat back member from the upright seating position to the folded storage position. The recliner latch actuator 32 includes a manually operable actuation lever 33 that is manually pivoted to move the recliner latch mechanism from the latched position to the released position to permit pivoting of the seat back member from its upright seating position to its folded storage position.

The construction of the recliner described above thus far is generally the same as the recliner disclosed by the allowed U.S. Pat. No. 6,860,560 of Wen H. Chiu and Karl A. Murphy issued on Mar. 1, 2005, the entire disclosure of which is hereby incorporated by reference. Furthermore, there will normally be a pair of the recliners respectively associated with the opposite lateral sides of the seat so that each side of the seat back 18 is firmly supported. Both recliners will be of the same general construction as each other except that there will normally be only a single recliner latch actuator 32 which may be connected by a shaft or by a cable mechanism to control operation of both of the recliners in the manner disclosed by U.S. patent application Ser. No. 10/899,901 of Hsing L. L. Liu and Karl A. Murphy, the entire disclosure of which is also hereby incorporated by reference.

Figure 5:
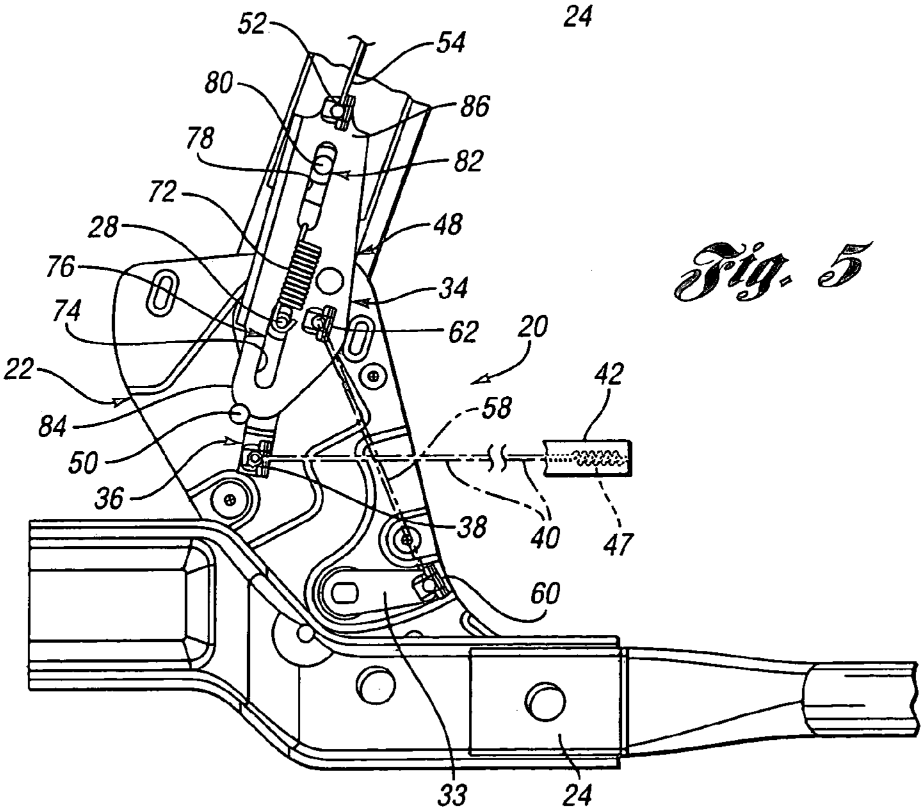
FIG. 5 is a view of the recliner similar to that of FIG. 4 but shown after a recliner latch actuator has released the seat back member for forward pivoting and just as a secondary latch actuator is about to disconnect the seat back from a release lever whose connection has released the rear latch of the seat to permit upward pivoting of the seat bottom to the position of FIG. 2.
Figure 6:
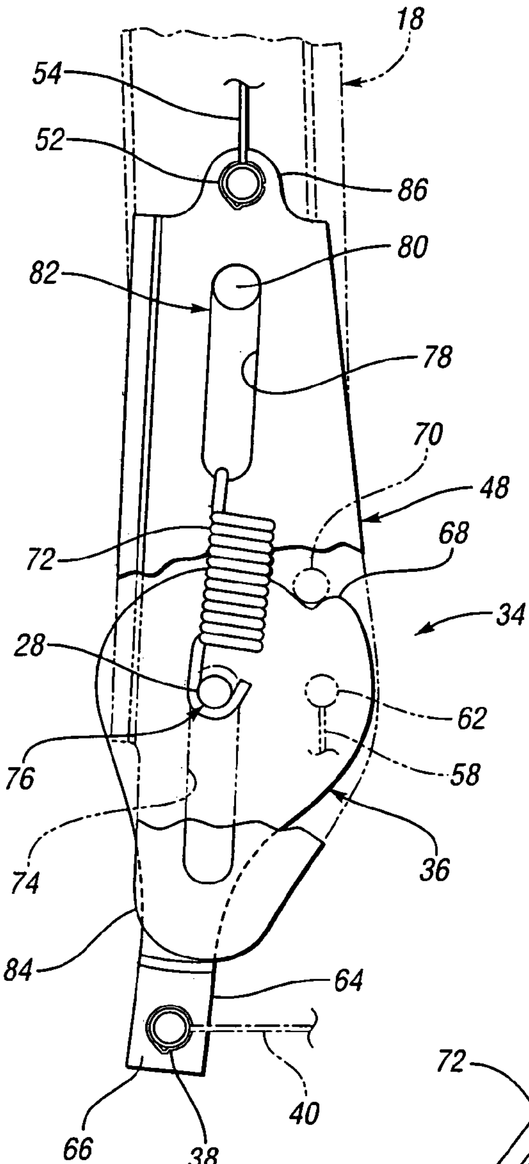
FIG. 6 is a view that illustrates the manner in which a connection lever and the release lever of the secondary latch actuator are connected to each other to provide the rear latch release.
Figure 7:
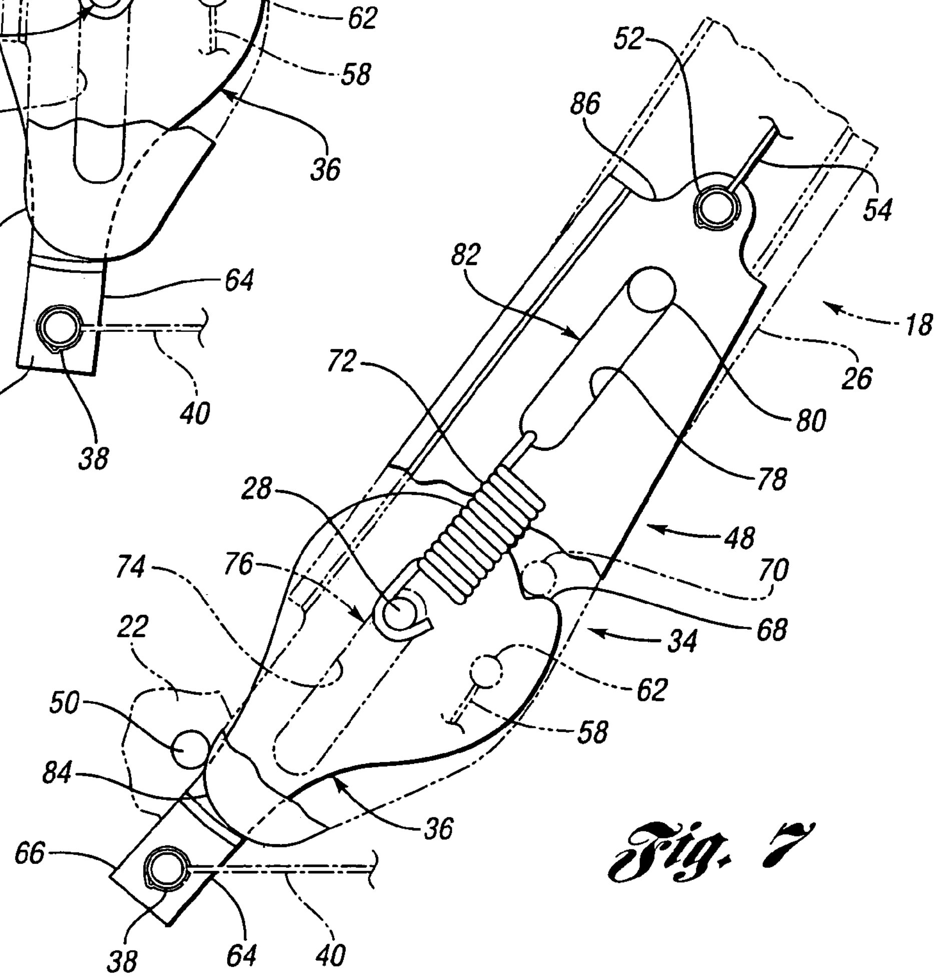
FIG. 7 is a view similar to FIG. 6 but showing the connection lever and the release lever after being uncoupled by an uncoupling member so that the seat back can continue to pivot to the folded storage position without any connection to the rear latch.

As shown in FIGS. 4 and 5, the recliner includes a secondary latch actuator 34 which, as shown in FIGS. 6 and 7, includes a release lever 36 having a connector 38. This connector 38 through a suitable connection cable 40 provides connection of the release lever as shown in FIGS. 1–3 to a rear latch 42 at the rear portion of the seat bottom 16. The rear latch 42 has a latched condition for engaging a keeper 44 on the vehicle floor 12 and is selectively released to permit upward pivoting of the seat bottom 16 to the vertical position of FIG. 2 about a pivotal connection 46 at the front portion of the seat bottom to the vertical position of FIG. 2. The rear latch 42 as shown schematically in FIGS. 4 and 5 includes a spring 47 that pulls on the cable 40 so as to bias the release lever 36 counterclockwise as viewed in FIGS. 6 and 7. Furthermore, there are actually two of the rear latches respectively associated with the opposite lateral sides of the seat bottom 16 and connected to their associated recliners as described above to provide the release lever counterclockwise biasing.

As illustrated in FIGS. 4–7, the secondary latch actuator 34 also includes a connection lever 48 having a connected position illustrated in FIG. 6 for connecting the release lever 36 to the seat back member 18 for pivoting therewith upon actuation of the recliner latch actuator for movement from the upright seating position of FIG. 1 toward the folded storage position. Such pivoting moves the release lever 36 along with the connection lever for clockwise rotation and through the cable 40 releases the rear latch so as to permit the upward pivoting of the seat bottom about the front portion pivotal connection to the upwardly extending position as the seat back pivots to the folded storage position in an upright direction alongside the seat bottom as illustrated in FIG. 2. As shown in FIGS. 5 and 7, an uncoupling member 50 is mounted on the seat bottom member 22 and, upon clockwise pivoting of the seat back 18 moves the connection lever 48 of the secondary latch actuator 34 to an unconnected position with respect to the release lever 36 after the rear latch is released so the seat back member can continue to pivot to the folded storage position without any connection to the rear latch. This is an important function since rear latches of the type utilized conventionally do not have sufficient capability to permit further cable movement after the release so the seat back can continue to pivot fully to the folded storage position without being restricted by the rear latch.

As shown in FIG. 4, the connection lever 48 has a connector 52 that is connected by a cable 54 to a seat back actuator 56. Furthermore, a cable 58 extends from a connector 60 on the actuating lever 33 of the recliner latch actuator 32 to another connector 62 on the connection lever 48 of the secondary latch actuator. When the seat back actuator 56 is operated, the cable 54 pulls on the connection lever 48 to move the secondary latch actuator 34 from the connected position of FIG. 6 to the unconnected position of FIG. 7 and, at the same time, the cable connection 58 pulls on the actuator lever 33 of the recliner latch actuator to provide counterclockwise movement thereof that releases the seat back for pivoting. Upon such seat back pivoting, the secondary latch actuator 34 is thus disconnected from the rear latch 42 so the seat back 18 can pivot to the folded storage position shown in FIG. 3 while the seat bottom 16 remains in a generally horizontal position with the seat back folded horizontally over the seat bottom.

As best illustrated in FIGS. 6 and 7, the release lever 36 is pivotally supported by the connection 28 between the seat back member on the seat bottom member and includes a leg 64 that projects generally downwardly and has a distal end 66 that supports the connector 38 of the release lever to the rear latch through the cable 40. The release lever 36 also includes a connection lobe 68 located above the pivotal connection 28. Furthermore, the connection lever 48 of the secondary latch actuator 34 includes a connection pin 70 for contacting the release lever connection lobe 68 as shown in FIG. 6 in the connected position. A spring 72 biases the connection lever 48 to engage its connection pin 70 with the release lever connection lobe 68 as shown in FIG. 6.

As shown in FIGS. 6 and 7, the connection lever 48 of the secondary latch actuator 34 includes a slot 74 that receives the pintle of the pivotal connection 28 to provide a first pin and slot connection 76 for supporting the connection lever. Furthermore, a second slot 78 in the connection lever 48 and a pin 80 on the seat back 18 provide a second pin and slot connection 82 of the connection lever such that the connection lever pivots with the seat back and is also movable with respect thereto and with respect to the pivotal connection 28 in a generally upwardly direction against the bias of spring 72.

Figure 8:
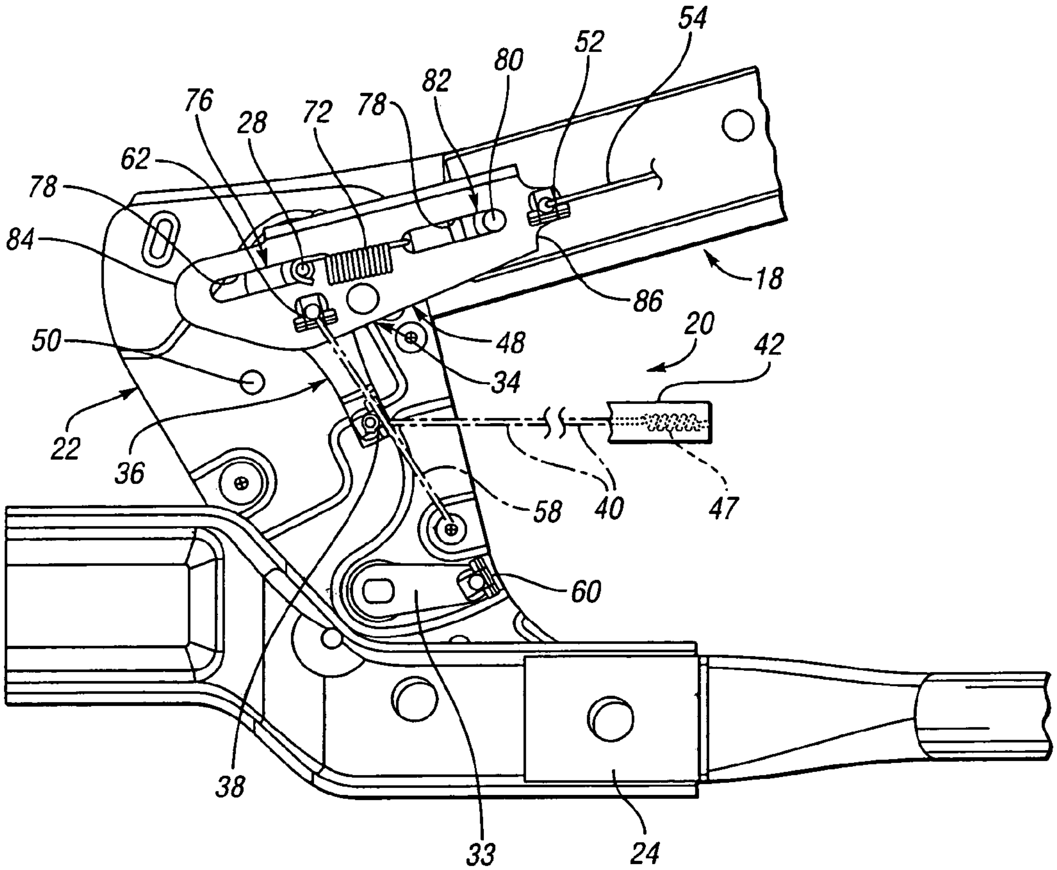
FIG. 8 is a view of the recliner taken in the same direction as FIGS. 4 and 5 but showing the seat back member pivoted farther downwardly toward the folded storage position.

Upon operation of the recliner latch actuator 32 to release the seat back 18 for clockwise pivoting, the flexibility of cable 58 initially prevents the counterclockwise pivoting of recliner latch lever 33 from moving the connection lever 48 with respect to the release lever 36. However, after the rear latch is released as described above, the connection lever 48 is moved into contact with the uncoupling member 50 as shown in FIG. 7. Continued clockwise pivoting of the seat back then causes the uncoupling member 50 to move the connection lever 48 upwardly and to the right against the bias of spring 72 so that its connection pin 70 disengages the release lever connection lobe 68 to release the release lever 36 from pivoting with the seat back. The release lever 38 is then pivoted counterclockwise by the rear latch spring bias to the position of FIG. 8 as the seat back continues to pivot about its pivotal connection 28 in a clockwise direction and eventually moves clockwise out of contact with the uncoupling member 50 so that the spring 72 moves the connection member back to its initial position with respect to the pivotal connection and the seat back.

Thus, the initial pivoting of the seat back upon its release by the recliner latch actuator allows the seat back pivoting to release the rear latch and the release lever is then disconnected from the seat back pivoting so that the seat back 18 and the seat bottom 16 can both move to the vertically stored position previously described in connection with FIG. 2.

The connection lever 48 as best shown in FIG. 7 has a first end 84 that is contacted by the uncoupling member 50 on the seat bottom member 22, and the connection lever also has a second end 86 that supports the connector 52 to the seat back actuator at a location generally adjacent the second pin and slot connection 82 between the connection lever and the seat back member. The spring 72 extends between the pivotal connection 28 and the slot 78 of the second pin and slot connection 82 to bias the connection lever 48 to contact its connection pin 70 with the release lever connection lobe 68.

Operation of the seat back actuator 56 as described above moves the connection lever 48 with respect to the release lever 36 so its connection pin 70 moves out of contact with the connection lobe 68 of the release lever to thus provide disconnection from the rear latch 42. Such disconnection permits the seat bottom 16 to remain latched in its horizontal position of FIG. 3 as the seat back 18 pivots to the horizontal position.

While an embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention as defined by the following claims.

What is claimed is:

1. A recliner for a vehicle foldable seat utilized with an associated vehicle, the recliner comprising:

a seat bottom member for mounting on a seat bottom of the foldable seat;

a seat back member for mounting a seat back of the foldable seat and having a pivotal connection for providing pivotal support of the seat back member on the seat bottom member for pivotal movement about a pivotal axis between an upright seating position and a folded storage position where the seat back extends generally parallel to the seat bottom;

a recliner latch mechanism having a latched position for holding the seat back member on the seat bottom member in the upright seating position and having a released position for permitting pivotal movement of the seat back member from the upright seating position to the folded storage position;

a recliner latch actuator for moving the recliner latch mechanism from the latched position to the released position to permit pivoting of the seat back member from its upright seating position to its folded storage position; and a secondary latch actuator having a release lever including a connector for connecting to a rear latch associated with a rear portion of the seat bottom to selectively release the rear latch from a latched condition to the associated vehicle to a released condition to permit pivoting of the seat bottom about a front portion thereof from a horizontal position to an upwardly extending position, the secondary latch actuator including a connection lever having a connected position for connecting the release lever to the seat back member for pivoting therewith upon actuation of the recliner latch actuator for movement from the upright seating position toward the folded storage position to move the connector thereof to release the rear latch so as to permit the pivoting of the seat bottom about the front portion thereof to the upwardly extending position as the seat back pivots to the folded storage position in an upright direction alongside the seat bottom, an uncoupling member for moving the connection lever from its connected position to an unconnected position with respect to the release lever after the rear latch is released so the seat back member can continue to pivot to the folded storage position without any connection to the rear latch, the connection lever having a connector to a seat back actuator that is actuatable when the seat back is in the upright seating position to move the connection lever from its connected position to its unconnected position with respect to the release lever so the rear latch remains latched, and the connection lever having a connection to the recliner latch actuator so the actuation of the seat back actuator also actuates the recliner latch actuator to move the recliner latch mechanism from its latched position to its released position so the seat back can pivot to the folded storage position while the seat bottom remains in a generally horizontal position with the seat back folded horizontally over the seat bottom.

2. A vehicle foldable seat recliner as in claim 1 wherein the release lever is pivotally supported by the pivotal connection of the seat back member on the seat bottom member and includes a leg having a distal end that supports the connector for providing connection of the release lever to the rear latch.

3. A vehicle foldable seat recliner as in claim 1 wherein the release lever includes a connection lobe and the connection lever includes a connection pin for contacting the release lever connection lobe in the connected position to move the release lever with the seat back member to release the rear latch.

4. A vehicle foldable seat recliner as in claim 1 wherein the release lever is pivotally supported by the pivotal connection of the seat back member on the seat bottom member and includes a leg having a distal end that supports the connector for providing connection of the release lever to the rear latch, and the release lever including a connection lobe and the connection lever including a connection pin for contacting the release lever connection lobe in the connected position to move the release lever with the seat back member to release the rear latch.

5. A vehicle foldable seat recliner as in claim 4 further including a spring that biases the connection lever to engages its connection pin with the release lever connection lobe.

6. A vehicle foldable seat recliner as in claim 4 wherein the connection lever includes a slot that receives the pivotal connection of seat back member on the seat bottom member to provide a first pin and slot connection at the pivotal axis, the connection lever and the seat back member including a second pin and slot connection, and the seat bottom member supporting the uncoupling member which moves the connection lever with respect to the release lever upon initial pivoting of seat back member to release the release lever from pivoting therewith after the rear latch has been released.

7. A vehicle foldable seat recliner as in claim 6 wherein the connection lever has a first end that is contacted by the uncoupling member on the seat bottom member, and the connection lever having a second end that supports the connection to the seat back actuator at a location adjacent the second pin and slot connection between the connection lever and the seat back member.

8. A vehicle foldable seat recliner as in claim 7 further including a spring that extends between the pivotal connection of the seat back member on the seat bottom member and the slot of the second pin and slot connection to bias the connection lever to contact its connection pin with the release lever connection lobe.

9. A recliner for a vehicle foldable seat utilized with an associated vehicle, the recliner comprising:

a seat bottom member for mounting on a seat bottom of the foldable seat;

a seat back member for mounting a seat back of the foldable seat and having a pivotal connection for providing pivotal support of the seat back member on the seat bottom member for pivotal movement about a pivotal axis between an upright seating position and a folded storage position where the seat back extends generally parallel to the seat bottom;

a recliner latch mechanism having a latched position for holding the seat back member on the seat bottom member in the upright seating position and having a released position for permitting pivotal movement of the seat back member from the upright seating position to the folded storage position;

a recliner latch actuator for moving the recliner latch mechanism from the latched position to the released position to permit pivoting of the seat back member from its upright position to its folded storage position; and a secondary latch actuator having a release lever that is pivotally supported by the pivotal connection of the seat back on the seat bottom and that includes a leg having a distal end, the distal end of the release member leg including a connector for connecting to a rear latch associated with a rear portion of the seat bottom to selectively release the rear latch from a latched condition to the associated vehicle to a released condition to permit pivoting of the seat bottom about a front portion thereof from a horizontal position to an upwardly extending position, the release lever also including a connection lobe, the secondary latch actuator including a connection lever having a connection pin, the connection lever having a connected position where its connection pin contacts the connection lobe of the release lever to connect the release lever to the seat back member for pivoting therewith upon actuation of the recliner latch actuator for movement from the upright seating position toward the folded storage position to move the connector thereof to release the rear latch so as to permit the pivoting of the seat bottom about the front portion thereof to the upwardly extending position as the seat back pivots to the folded storage position in an upright direction alongside the seat bottom, an uncoupling member mounted on the seat bottom member such that seat back pivoting moves the connection lever from its connected position to an unconnected position where the connection pin of the connection lever is out of contact with the connection lobe of the release lever after the rear latch is released so the seat back member can continue to pivot to the folded storage position without any connection to the rear latch, the connection lever having a connector to a seat back actuator that is actuatable when the seat back is in the upright seating position to move the connection lever from its connected position to its unconnected position with respect to the release lever so the rear latch remains latched, and the connection lever having a connection to the recliner latch actuator so the actuation of the seat back actuator also actuates the recliner latch actuator to move the recliner latch mechanism from its latched position to its released position so the seat back can pivot to the folded storage position while the seat bottom remains in a generally horizontal position with the seat back folded horizontally over the seat bottom.

10. A recliner for a vehicle foldable seat utilized with an associated vehicle, the recliner comprising:

a seat bottom member for mounting on a seat bottom of the foldable seat;

a seat back member for mounting a seat back of the foldable seat and having a pivotal connection for providing pivotal support of the seat back member on the seat bottom member for pivotal movement about a pivotal axis between an upright seating position and a folded storage position where the seat back extends generally parallel to the seat bottom;

a recliner latch mechanism having a latched position for holding the seat back member on the seat bottom member in the upright seating position and having a released position for permitting pivotal movement of the seat back member from the upright seating position to the folded storage position;

a recliner latch actuator for moving the recliner latch mechanism from the latched position to the released position to permit pivoting of the seat back member from its upright position to its folded storage position; and a secondary latch actuator having a release lever that is pivotally supported by the pivotal connection of the seat back on the seat bottom and that includes a leg having a distal end, the distal end of the release member leg including a connector for connecting to a rear latch associated with a rear portion of the seat bottom to selectively release the rear latch from a latched condition to the associated vehicle to a released condition to permit pivoting of the seat bottom about a front portion thereof from a horizontal position to an upwardly extending position, the release lever also including a connection lobe, the secondary latch actuator including a connection lever having a connection pin, a first pin and slot connection that mounts the connection lever on the pivotal connection between the seat back member and the seat bottom member, a second pin and slot connection between the connection lever and the seat back member, the connection lever having a connected position where its connection pin contacts the connection lobe of the release lever to connect the release lever to the seat back member for pivoting therewith upon actuation of the recliner latch actuator for movement from the upright seating position toward the folded storage position to move the connector thereof to release the rear latch so as to permit the pivoting of the seat bottom about the front portion thereof to the upwardly extending position as the seat back pivots to the folded storage position in an upright direction alongside the seat bottom, a spring that biases the connection lever toward its connected position with its connection pin contacting the release lever connection lobe, an uncoupling member mounted on the seat bottom member such that seat back pivoting moves the connection lever against its spring bias from its connected position to an unconnected position where the connection pin of the connection lever is out of contact with the connection lobe of the release lever after the rear latch is released so the seat back member can continue to pivot to the folded storage position without any connection to the rear latch, the connection lever having a connector to a seat back actuator that is actuatable when the seat back is in the upright seating position to move the connection lever from its connected position to its unconnected position with respect to the release lever so the rear latch remains latched, and the connection lever having a connection to the recliner latch actuator so the actuation of the seat back actuator also actuates the recliner latch actuator to move the recliner latch mechanism from its latched position to its released position so the seat back can pivot to the folded storage position while the seat bottom remains in a generally horizontal position with the seat back folded horizontally over the seat bottom.

* * * * *

UNITED STATES PATENT AND TRADEMARK OFFICE

CERTIFICATE OF CORRECTION

PATENT NO. : 7,000,990 B1
APPLICATION NO. : 11/086921
DATED : February 21, 2006
INVENTOR(S) : Hsing Lung Lewis Liu, Wen H. Chiu and Karl A. Murphy It is certified that error appears in the above-identified patent and that said Letters Patent is hereby corrected as shown below:

Column 7,
Line 44, delete "engages" and replace with -- engage --.

Signed and Sealed this

Twentieth Day of June, 2006

JON W. DUDAS
*Director of the United States Patent and Trademark Office*